United States Patent
Ogasawara et al.

[11] 3,936,579
[45] Feb. 3, 1976

[54] ABSORBENT FILM PRODUCED BY VACUUM EVAPORATION

[75] Inventors: Yoshiaki Ogasawara, Yokohama; Katsumi Noguchi, Gamagohri, both of Japan

[73] Assignee: Nippon Kogaku K.K., Tokyo, Japan

[22] Filed: Feb. 22, 1973

[21] Appl. No.: 334,572

Related U.S. Application Data

[63] Continuation-in-part of Ser. No. 117,288, Feb. 22, 1971, abandoned.

[30] Foreign Application Priority Data
Feb. 25, 1970  Japan................................ 45-15505

[52] U.S. Cl. .................. 428/432; 350/1; 350/164; 350/314; 351/163; 427/164; 427/166; 427/248; 427/250; 427/255; 428/433; 428/457; 428/539
[51] Int. Cl.² .. B32B 17/06; G02B 1/10; G02B 5/22
[58] Field of Search ........... 117/124 B, 124 C, 33.3, 117/121, 106 R, 107, 22, 23, 66; 264/1; 350/1, 164–166, 314; 427/164, 166, 248, 250, 255; 428/432, 433, 457, 539; 351/63

[56] References Cited
UNITED STATES PATENTS
3,010,850  11/1961  Colbert et al.................. 117/107 X

*Primary Examiner*—William D. Martin
*Assistant Examiner*—William H. Schmidt
*Attorney, Agent, or Firm*—Fitzpatrick, Cella, Harper & Scinto

[57] ABSTRACT

Absorbent film which has a great adhesion, a great mechanical strength and a high resistivity to heat and other radiation and which is applicable to sun glasses, color filters, phase plates used for the differential phase method, apodization filters and the like. The absorbent film is produced by mixing together powdered Ti, powdered Cr and powdered $MgF_2$ into the form of a powdered mixture or shaping them into a compressed mass of mixture, thereafter vacuum-evaporating said mixture onto a predetermined base material such as lens glass to thereby provide a refractive factor of about 1.52 and an absorption coefficient of about 0.01 to 0.4. At least one layer of such absorbent film may be used to form a multi-layer film structure.

2 Claims, 11 Drawing Figures

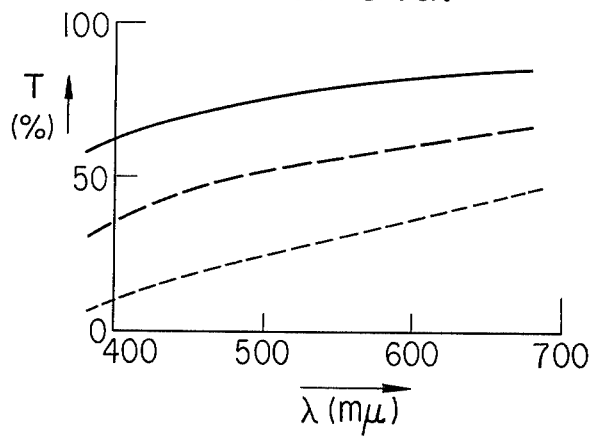
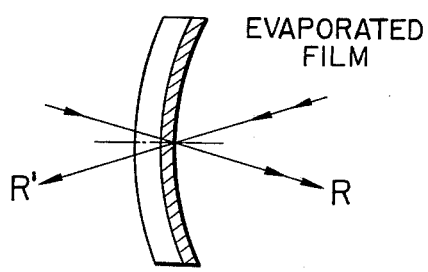
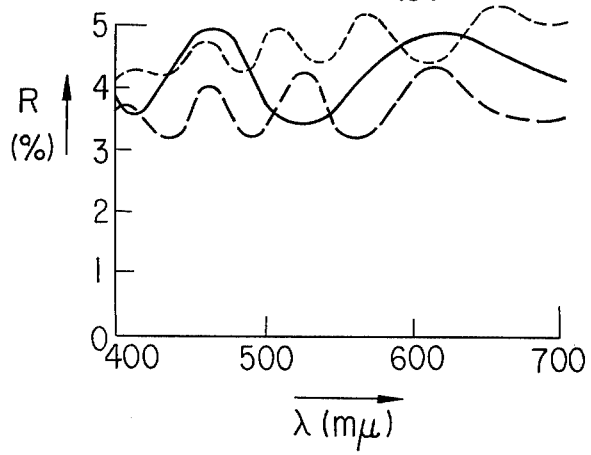
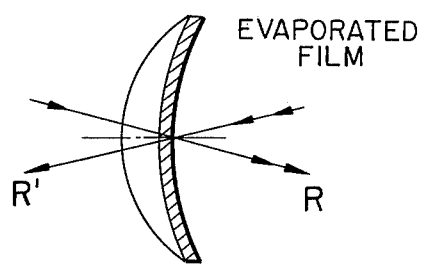
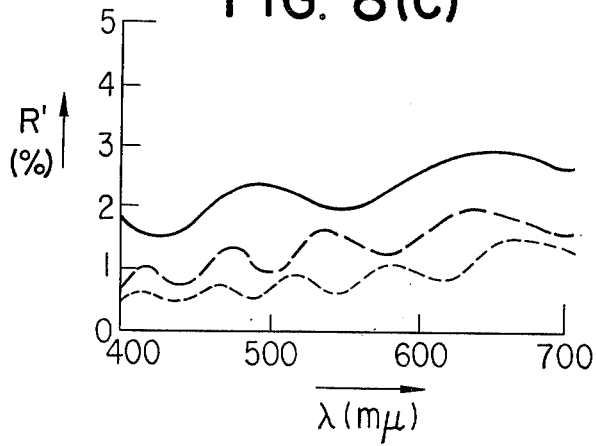

ABSORBENT FILM PRODUCED BY VACUUM EVAPORATION

This application is a continuation-in-part of my co-pending application Ser. No. 117,288, filed Feb. 22, 1971, now abandoned.

BACKGROUND OF THE INVENTION

1. Field of the Invention

This invention relates to absorbent film provided by a vacuum evaporation technique.

2. Description of the Prior Art

It has widely been practiced to produce absorbent film by the use of the vacuum evaporation technique and employing such film for color filters, neutral filters, sun glasses and phase plates for the differential phase technique.

Such absorbent film is usually composed of a metal or a metal compound especially such as metal oxide, and has a high refractive factor and a high absorption coefficient, which will not only result in a high reflection factor in both sides of the film adjacent the atmosphere and the base glass but also lead to a less aesthetic appearance and a great inconvenience in use.

In order to reduce the amount of reflected light, a single or multiple layers of dielectric film have been formed on the absorbent film by using the vacuum evaporation technique so as to prevent the occurrence of light reflection. Even this method, however, has encountered difficulties in effectively preventing the reflection of visible rays over their entire range, and the reflected light in this case is always seriously colored. To attain a predetermined coloring of such reflected light, the layer or layers of dielectric film to be formed on the absorbent film must be of a very high accuracy and otherwise controlled, and this makes it difficult to achieve a reproductivity of such film. In addition, presence of any slight fingerprint, water drop, fatty or greasy material or the like on the film would immediately vary the coloring of light to seriously injure the aesthetic value of the film.

Evidently, these drawbacks may be avoided by providing a thick and uniform film of a low absorption coefficient and whose refractive factor for the entire range of visible light is about 1.52, which is approximately equal to that of the conventionally used base glass. This is because such a film formed on the glass surface would permit only about 4% of the incident light to be reflected and thereby eliminate any coloring. The formation of such film may be accomplished by any of the various methods shown below.

i. A mixture of a dielectric material (non-absorbent material) and a metal (absorbent material) is evaporated from a single source of evaporation;

ii. The same mixture is evaporated from two discrete sources of evaporation; or iii. A non-uniform film is produced so that the density ratio of the absorbent material to the non-absorbent material is least in the opposite surfaces of the film adjacent to the base glass and the atmosphere and greatest in the intermediate region of the film. The refractive factor in the said opposite surfaces of the film is substantially equal to the refractive factor of the base glass.

Success of the first-named method above is very much dependent on the materials selected, and usually it is very difficult to form a uniform and sufficiently thick film of a mixture at a predetermined ratio through evaporation. Even if such film could be attained at all, any thickness thereof exceeding a certain value would cause the film to readily separate from the base glass (weak adhesion) or to be fractured (inferior mechanical strength).

In some instances such film is poor in the resistivity to abrasion, heat and humidity, and in many instances it becomes seriously brownish due to the oxidation resulting from ultraviolet rays. A film having a high resistivity to mechanical, chemical and weather conditions could be formed by this method, but this would be impossible without resorting to the electronic beam evaporation technique or the like.

The second-named method above is unsuitable for mass production because it involves very delicate control of the rates of evaporation from the two sources of evaporation and some other delicate controls in order to provide a uniform film of a predetermined mixing ratio.

The third-named method is also difficult in terms of reproductivity because considerably complex and sophisticated controls are involved therein as in the case of the second method.

SUMMARY OF THE INVENTION

It is an object of the present invention to provide absorbent film having a great adhesion, a great mechanical strength and a high resistivity to heat and other radiation by using the principle of the method mentioned under item i) above while employing magnesium fluoride as the dielectric material and powdered titanium and chromium as the metal material.

It is another object of the present invention to provide a multi-layer film structure which comprises at least one layer of such absorbent film as described above.

BRIEF DESCRIPTION OF THE DRAWINGS

The present invention will be better understood from the following description of some specific embodiments thereof taken in conjunction with the accompanying drawings, in which:

FIGS. 7(a) and 7(b) are enlarged cross-sectional views of a concave meniscus lens and a convex meniscus lens each having an absorbent film of the present invention applied thereto; and FIGS. 8(a), 8(b) and 8(c) are graphs illustrating the spectral transmittivity characteristics of the absorbent film embodying the present invention, the spectral reflection characteristics of such film in the surface thereof adjacent to the atmosphere, and the spectral reflection characteristics in the other surface adjacent to the base glass, respectively.

DETAILED DESCRIPTION

Figure 1:
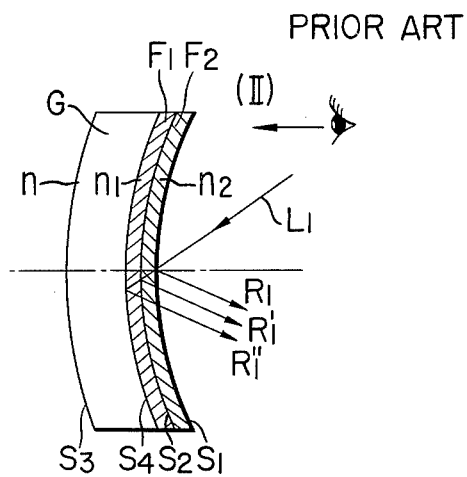
FIG. 1 is an enlarged cross-sectional view of a meniscus lens of the prior art showing the reflective effect from the concave side thereof.

The prior art glass shown in FIG. 1 is coated with an absorbent thin film $F_1$ on the concave surface to attain the predetermined transmissivity. The prior art glass is further coated with dielectric anti-reflection film $F_2$ on the absorbent film $F_1$ so as to reduce reflection at the outer surface of the absorbent film $F_1$, or otherwise the reflection would be increased by 20–30%. In the prior art glass, refractive index $n_1$ of the absorbent film $F_1$, refractive index $n_2$ of the anti-reflection film $F_2$ and refractive index $n$ of the glass G are different from each other so that optical interfaces $S_4$ and $S_2$ are formed between the glass G and the film $F_1$ and between the films $F_1$ and $F_2$. An observer would see colored reflection light, for instance bluish reflection light, when he looks at the prior art glass from the right side (II), as shown in FIG. 1. The colored reflection light is caused by the interferences of the reflection light rays $R_1$ at the surface $S_1$, the reflection light rays $R_1'$ on the optical interface $S_2$ and the reflection light rays $R_1''$ on the optical interface $S_4$. Such a colored reflection light caused by the interference of the reflection light make a bad appearance.

It is a first object of the present invention to eliminate undesirable colors caused by the interference of the reflection light rays at the air side of said thin films, and to thereby make a good appearance.

Figure 2:
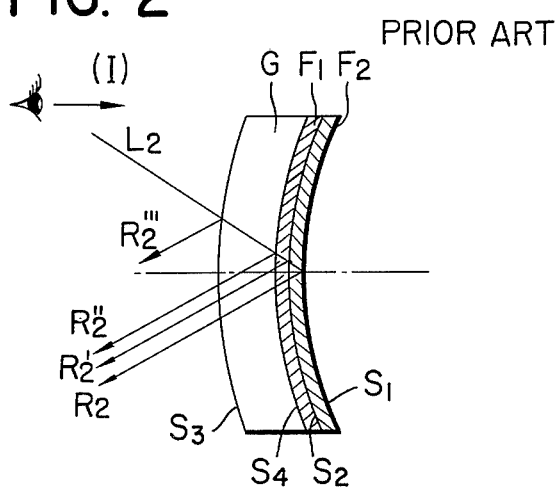
FIG. 2 is an enlarged cross-sectional view of the lens of FIG. 1 showing the reflective effect from the convex side thereof.

When the prior art glass is viewed from the convex side thereof, as shown by arrow I in FIG. 2, one can see, two kinds of lights, colored and white reflection lights, for example. The incident light rays $L_2$ are firstly reflected at a surface $S_3$ of the glass G to make reflection light rays $R_2'''$ which are acknowledged as the white color. The incident light rays $L_2$ which are not reflected at the surface $S_3$, are then reflected at the optical interfaces $S_4$, $S_2$ and the surface $S_1$. The colored reflection light is caused by the interferences of the reflection light rays $R_2''$ on the optical interface $S_4$, the reflection light rays $R_2'$ on the optical interface $S_2$ and the reflection light rays $R_2$ at the surface $S_1$.

Such colors, when the glass is observed from the direction shown by the arrow I, make an undesirable appearance.

A second object of this invention is to prevent the convex side reflection light from being colored by interference, so that the convex side reflection light is similar to the transmission light, thereby making a good appearance.

Figure 3:
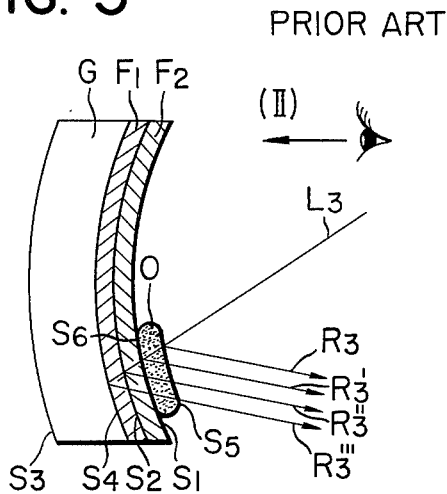
FIG. 3 is an enlarged cross-sectional view of the lens of FIG. 1 showing the reflective effect of a finger print on the surface of the film.

In the event that a finger print O is left on the surface $S_1$ of the film $F_2$, as shown in FIG. 3, one can see a luminous image of the finger print O, the image having different color and brightness from the interference colors of the other portions, when the lens is viewed from the direction of arrow II. The incident light rays $L_3$ are partially reflected, firstly at the surface $S_5$ of the finger print O as reflection light rays $R_3$, secondly on the optical interface $S_1$ between the finger print O and the film $F_2$ as reflection light rays $R_3'$, thirdly at the optical interface $S_2$ as reflection light rays $R_3''$, and at the optical interface $S_4$ as reflection light rays $R_3'''$. By the interference of these reflection light rays $R_3$, $R_3'$, $R_3''$ and $R_3'''$, there is formed a luminous finger print image.

It is a third object of the invention to prevent the thin film interference when any oil, or the like, is left on the surface of the thin film so as to eliminate the luminous reflection light.

The said first, second and third objects of the present invention can be attained by approximately equalizing the refractive index $n'$ of an absorbent film F with the refractive index $n$ of a glass G so that the optical interface between the glass and the absorbent film is eliminated.

Figure 4:
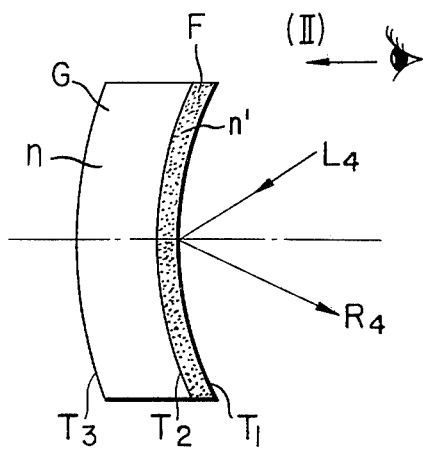
FIG. 4 is an enlarged cross-sectional view of a meniscus lens of the present invention showing the reflective effect from the concave side thereof.

Thus, incident light rays $L_4$ are not reflected at the surface $T_2$ between the glass G and the absorbent film F, but are reflected at the surface $T_1$, as shown in FIG. 4. If the subject glass is viewed from the direction of arrow II, the reflected light rays $R_4$ do not interfere so that only white color is visible, which is the same as that reflected at the glass surface. Thus, said first object is attained.

Figure 5:
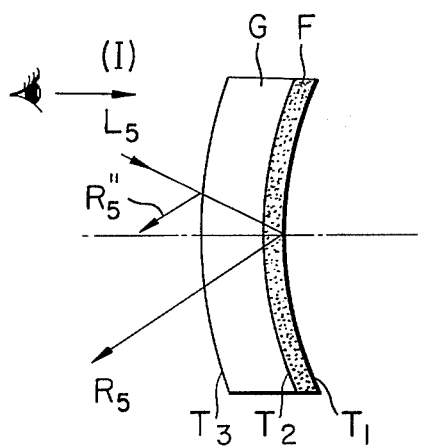
FIG. 5 is an enlarged cross-sectional view of the lens of FIG. 4 showing the reflective effect from the convex side thereof.

In the glass G, there is practically no optical interface, and so there is no reflection at the surface $T_2$, as shown in FIG. 5. Therefore, the reflected light rays $R_5$ at the side of the glass can not interfere, so that there can be no coloration of the reflection light rays at the glass side of the film F. If the glass is viewed from the direction of arrow I, as shown in FIG. 5, one will observe colored reflection light rays, which are similar to the transmitting light rays. Thus, the said second object can be attained.

Figure 6:
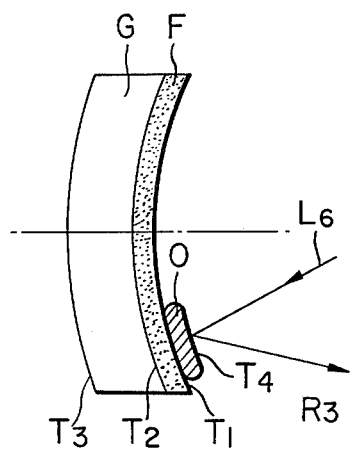
FIG. 6 is an enlarged cross-sectional view of the lens of FIG. 4 showing the reflective effect of a finger print on the surface of the film.

As best seen in FIG. 6, the refractive index of a finger print O approximately equals that of the glass G so that there is no optical interface between the absorbent film F and the finger print O. Accordingly, the light rays $L_6$ are not reflected at the surface $T_1$ between the finger print O and the absorbent film F, but are reflected only at the surface $T_4$ of the finger print O, as shown in FIG. 6. Thus, there is no luminous light from the surface of the finger print O, and consequently the third object of the present invention is attained.

The fourth object of the present invention is attained by substantially equalizing the refractive index of the thin film F with that of the glass and by reducing the absorbent coefficient of the thin film F within 0.01–0.4. It is noted that as a practical matter it is difficult to equalize the refractive index of the absorbent film F with that of the glass. However, if the thickness of the thin film is at least more than one wave-length, then no interference occurs even if the refractive indices are slightly different from each other.

For attaining the aforesaid first to fourth objects while forming an absorbent thin film having the desired transmissivity, it is necessary to vary the absorbent coefficient in accordance therewith. For this purpose, the weight ratio among the vapor-deposition materials Cr, Ti and $MgF_2$ is varied. For forming an absorbent thin film having the absorbent coefficient ranging from 0.4 to 0.01, the weight ratio of the vapor-deposition materials is determined to be Cr: 1.0, Ti: 0.02–0.2 and $MgF_2$: 1.5–0.10, for example.

Referring to FIGS. 7(a) and 7(b), there are shown examples of the absorbent film applied to two different types of lens according to the present invention. The present invention in principle falls within the category of the method referred to under item i) above, and employs magnesium fluoride ($MgF_2$, $n = 1.40$) as the dielectric material, and powdered titanium (Ti) and chromium (Cr) as the metal material. These three materials at a suitable ratio are sufficiently mixed together mechanically so as to form a powdered mixture or further shaped into a compressed mass. The mixture is then evaporated from a single source of evaporation by resistance-heating it in a vacuum of $10^{-5}$ Torr.

An evaporated film thus obtained has a low absorption coefficient and a low refractive index which is at best $n \approx 1.5$. The evaporating condition of the mixture is maintained very stably in the vacuum of $10^{-5}$ Torr, and the result is a uniform and sufficiently thick absorbent film having such an excellent reproductivity that the naked eye would sense no appreciable difference either for the color of the transmitted light or for the color of the reflected light. If the glass on which the absorbent film is evaporated has a refractive index of about 1.52, a reflection index of 4% may be provided anywhere in the surface of the film adjacent the atmosphere. The optical density of the evaporated film is determined only by the thickness thereof, and the maximum possible density is $D \approx 1.0$ or greater for $\lambda = 5000A$. Irrespective of the high or low temperature in the base glass, the evaporated film thus provided has a greater strength than a film formed by evaporating a single component material.

If the base glass is heated to about 350°C, the resulting product will not suffer from any variation due to aging and will have a greatly increased wear resistivity and adhesion and, also, a practically sufficient resistivity to chemicals. The test of resistivity to weather, particularly to heat (8-hour exposure to air at 300°C) and exposure to ultraviolet rays (200-hour exposure to ultraviolet rays ten times the mean sunlight) has showed that the variation in the reflection index is lower than $\pm 0.2\%$ for both surfaces of the film which are adjacent to the atmosphere and the base glass, respectively.

The combination of the aforesaid two materials $MgF_2$, and Cr is selected on the grounds described hereinafter.

The evaporating temperatures of $MgF_2$ and Cr for a vacuum of $10^{-4}$ Torr are 1540°C and 1430°C respectively, which may be regarded as approximately equal to each other. This is very useful for the combination.

Further, even if the evaporation of such mixture follows Raoult's laws (see the table below), the values of $P/\sqrt{M}$ for $MgF_2$ and Cr are approximately equal to each other so that a stable evaporation can be expected to occur.

It has also been found empirically that the addition of powdered Ti as a third component to $MgF_2$ and Cr greatly increases the adhesion, mechanical strength and resistivity of the resulting film to radiations such as heat and ultraviolet rays.

|   | Molecular Weight | Evaporation Pressure(P) at 1400°C (T) | $P/\sqrt{MmmHg}$ |
|---|---|---|---|
| $MgF_2$ | 62.3 | $1 \times 10^{-5}$ mmHg | $1 \times 10^{-6}$ |
| Cr | 52.0 | $5 \times 10^{-5}$ mmHg | $7 \times 10^{-6}$ |
| Ti | 47.9 | $2 \times 10^{-7}$ mmHg | $3 \times 10^{-8}$ |

The combination of these three materials ensures a stable evaporation for a very wide range of mixing ratios, without causing the materials to vaporize and evaporate discretely from one another, and the mixing ratio of the three materials can be empirically selected to an optimum value in accordance with such factors as the spectral transmittivity or spectral density to be obtained, the desired spectral reflection factor, the color variation of the reflected light resulting from the variation of the film thickness, the temperature of the glass base, and the size of the evaporation boat in use.

The ratio in weight between the three materials is shown below by way of example.

|   |   |
|---|---|
| Ti | 0.02 – 0.2 |
| Cr | 1.0 |
| $MgF_2$ | 0.10 – 1.5 |

The boat used for the resistance-heating should be formed by molybdenum and have a sufficient current capacity and a sufficient volume capacity. The boat is charged with a suitable quantity of the mixture to be evaporated and then subjected to breathing and preheating, whereafter the mixture is evaporated while being maintained at a temperature of about 1100°C by a predetermined heating source. Thus, there is provided a more stable condition for vaporization and evaporation.

Referring to FIGS. 8(a), 8(b), and 8(c), there are shown the spectral transmittivity characteristics (T) and the spectral reflective index characteristics (R for the surface adjacent to the atmosphere and R' for the surface adjacent the glass) of the single-layer film with respect to the base glass (whose refractive index is 1.52) in an embodiment of the present invention. In FIGS. 8(a), 8(b) and 8(c), the solid-line curves, dashed-line curves and dotted-line curves, respectively, represent the measurements of the three types of films having different optical densities. As will be seen from the spectral reflective characteristics shown in FIGS. 8(a), 8(b) and 8(c), the reflected light R in the surface of the film exposed to the atmosphere is white or non-colored, while the reflected light R' in the other surface adjacent to the base glass is similar in color to the transmitted light. Therefore, the appearance of the lens can be greatly improved by disposing the latter surface so as to look toward the atmosphere.

The lens thus provided creates no coloring in the reflected light even if it is spotted with fingerprints, water drops or greasy stains, and in addition, it has an improved reproductivity. Moreover the single-layer structure of the absorbent film only requires that care be taken of the transmittivity to monochromatic light during the manufacture, and this leads to simplified mass production of absorbent films having any desired density.

Further, it is of course possible to additionally provide a reflection preventing film of the known type on the described single-layer film formed according to the present invention.

The absorbent film produced according to the present invention will find various applications in the following fields:

1. Sun glasses having a surface adjacent to the atmosphere for permitting white light to be reflected at a low rate of reflection, and a surface adjacent to the glass for permitting the reflection of light similar in color to the transmitted light, both reflected lights being substantially unaffected by any stain or spot present in those surfaces.

2. Color filters with an evaporated film having an especially low reflection surface adjacent to the glass and a surface adjacent to the atmosphere provided with a reflection characteristic similar to that of a solid filter.

3. Absorbent phase plates of a low reflection index used for the phase difference method. For this purpose, the prior art has employed a metallic film which tends to produce a great quantity of harmful reflected light and requires an additional film for preventing such reflection.

4. Absorbent filters such as apodization filters capable of transmitting phase information as well. Since the absorbent film of the present invention can be made to have a refractive index of about 1.52, the matching of the refractive index can be accomplished readily and accurately by the use of cement such as balsam or the like.

5. Since the absorbent film of the present invention can be regarded as an approximate equivalent to the base glass whose refractive index is about 1.52, any such film in a single layer or multiple layers designed so as to suit an overlying or underlying glass base having a refractive index of about 1.52 can be applied thereto substantially without changing or modifying it in any way. In fact, the absorbent film of the present invention may be applied by evaporation to either side of a reflection preventing film, a reflection promoting film, a band-pass filter such as cold filter, an interference filter or the like so as to provide them with absorbent characteristics, as well as increased adhesion or protection effect.

6. The absorbent film of the present invention means a material having any low absorption coefficient in the following range of optical constants:

$n$ (refractive index) $\approx$ 1.45–1.60

$k$ (absorption coefficient) $\approx$ 0.01–0.4

Thus, the present invention enables an unknown or novel material having a low absorption coefficient to be produced artificially, as desired, and it can be utilized to design a film structure including at least one layer of film having such optical constants or to realize a design which will require the use of at least one layer of such film.

Although certain particular embodiments of the invention are herein disclosed for purposes of explanation, various modifications thereof, after study of this specification, will be apparent to those skilled in the art to which the invention pertains.

What is claimed and desired to be secured by Letters Patent is:

1. In an absorbent film deposited on a substrate having a refractive index of about 1.52 by evaporating a mixture of plural materials within a vacuum; the improvement wherein the mixture comprises Cr, Ti and $MgF_2$ and the ratio in weight of said Cr, Ti and $MgF_2$ is 1.0 : 0.02 to 0.2 : 0.10 to 1.5 such that the absorbent film has the same refractive index as the substrate and an absorption coefficient of from about 0.01 to about 0.4.

2. An absorbent film as defined in claim 1, in which said absorbent film is deposited on the substrate by evaporation in a vacuum of 1 to $10 \times 10^{-5}$ Torr.

* * * * *